United States Patent [19]
Leonberger

[11] Patent Number: 5,909,326
[45] Date of Patent: Jun. 1, 1999

[54] EXTERNAL REARVIEW MIRROR

[75] Inventor: Karl-Heinz Leonberger, Hochdorf, Germany

[73] Assignee: Reitter & Schefenacker GmbH & Co. KG, Esslingen, Germany

[21] Appl. No.: 08/844,095

[22] Filed: Apr. 18, 1997

[30] Foreign Application Priority Data

Apr. 19, 1996 [DE] Germany .......................... 196 15 476

[51] Int. Cl.⁶ ...................................................... G02B 5/08
[52] U.S. Cl. ............................ 359/841; 359/872; 359/875
[58] Field of Search ..................................... 248/476, 479, 248/549, 900; 359/841, 872, 875

[56] References Cited

U.S. PATENT DOCUMENTS

| 4,863,255 | 9/1989 | Seitz ......................................... 359/875 |
|---|---|---|
| 4,981,279 | 1/1991 | Andreas et al. .......................... 359/872 |
| 5,383,057 | 1/1995 | Kimura et al. ........................... 359/875 |

*Primary Examiner*—Cassandra Spyrou
*Assistant Examiner*—Craig H. Curtis
*Attorney, Agent, or Firm*—Robert W. Becker & Associates

[57] ABSTRACT

An exterior rearview mirror for motor vehicles has a mirror arm and a mirror housing connected to the mirror arm so as to foldable about a pivot axis relative to the mirror arm. A support plate is mounted in the mirror housing. A mirror pane is attached to the support plate so as to face outwardly relative to the mirror housing. An adjusting device for adjusting a position of the mirror pane from the interior of the motor vehicle is provided. The adjusting device includes a first adjusting member accessible from the interior of the motor vehicle. The adjusting device includes a second adjusting member mounted within the housing. The first and second adjusting members are connected to one another so as to be pivotable about a common axis. The common axis coincides substantially with the pivot axis of the housing.

20 Claims, 13 Drawing Sheets

EXTERNAL REARVIEW MIRROR

BACKGROUND OF THE INVENTION

The invention relates to an exterior rearview mirror for a vehicle, preferably a motor vehicle, comprising a mirror arm and a mirror housing which can be folded relative to the mirror arm and has mounted therein a support plate for the mirror pane. The support plate is adjustable in its position by an adjusting device that can be actuated by a control element from the interior of the motor vehicle.

Exterior rearview mirrors are known in which the folding action of the mirror housing resulting from an impact disengages the adjusting device from the support plate in order to allow for the folding movement of the mirror housing. Upon returning the mirror housing into the operational position there is the problem that the support plate and the adjusting device are to be connected to one another such that the support plate again assumes its original (adjusted) position.

It is therefore an object of the present invention to embody an exterior rearview mirror of the aforementioned kind such that for a simple constructive embodiment of the adjusting device it is ensured that the mirror pane support plate, after folding of the mirror housing and its return into the operational position, assumes again the originally adjusted position.

SUMMARY OF THE INVENTION

The exterior rearview mirror for motor vehicles according to the present invention is primarily characterized by:

A mirror arm and a mirror housing connected to the mirror arm so as to be foldable about a pivot axis relative to the mirror arm.

A support plate mounted in the mirror housing;

A mirror pane attached to the support plate so as to face outwardly relative to the mirror housing;

An adjusting device for adjusting a position of the mirror pane from the interior of a motor vehicle;

The adjusting device comprising a first adjusting member accessible from the interior of the motor vehicle;

The adjusting device comprising a second adjusting member mounted within the mirror housing;

The first and second adjusting members connected to one another so as to be pivotable about a common axis;

Wherein the common axis coincides substantially with a pivot axis of the mirror housing.

The first adjusting member is pivotably supported within the mirror arm.

The first adjusting member includes a control lever projecting into the interior of the motor vehicle and an intermediate member rigidly connected to the control lever and extending into the mirror housing.

The control lever is preferably a one-arm lever.

The intermediate member is a U-shaped bracket having a first leg forming the common axis.

The second adjusting member preferably further comprises a bearing ball. The U-shaped bracket has a second leg. The control lever is connected to the bearing ball and to the second leg is rigidly connected to the bearing ball.

The control lever and the intermediate member are expediently positioned in a common plane.

The adjusting device comprises a control member supported rotatably on the common axis of the first adjusting member.

The housing has a fixedly mounted holder. The control member comprises an axle and the axle is supported in the holder.

The axle is displacable within the holder in a direction transverse to an axis of the axle.

The holder has two parallel legs each having a slotted hole engaged by the axle.

The control member is pivotably connected to the support plate.

The support plate has a bearing member projecting from a face of the support plate facing the interior of the housing, wherein the control member engages the bearing member.

Advantageously, the exterior rearview mirror further comprises a spring disk positioned between the mirror housing and the mirror arm and biasing the mirror housing against the mirror arm.

Advantageously, the spring arm comprises a projection and the spring disk surrounds the projection.

The mirror housing has a support member surrounding the projection.

The spring disk preferably rests on the projection.

Advantageously, the projection has an abutment for supporting the spring disk.

The spring disk has at least one tab for resting on the abutment.

The spring disk preferably has at least one snap-on element and the mirror arm has at least one snap-on counter element for cooperating with the at least one snap-on element.

In the inventive exterior rearview mirror the adjusting device, during folding of the mirror housing, does not become disengaged from the mirror pane support plate but remains connected thereto. The two adjusting members of the adjusting device are pivoted relative to one another when the mirror housing is folded relative to the mirror arm. This ensures that the mirror pane support plate will resume its adjusted (original) position relative to the mirror housing when folded and then returned into the operational position.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 13.

Figure 4:
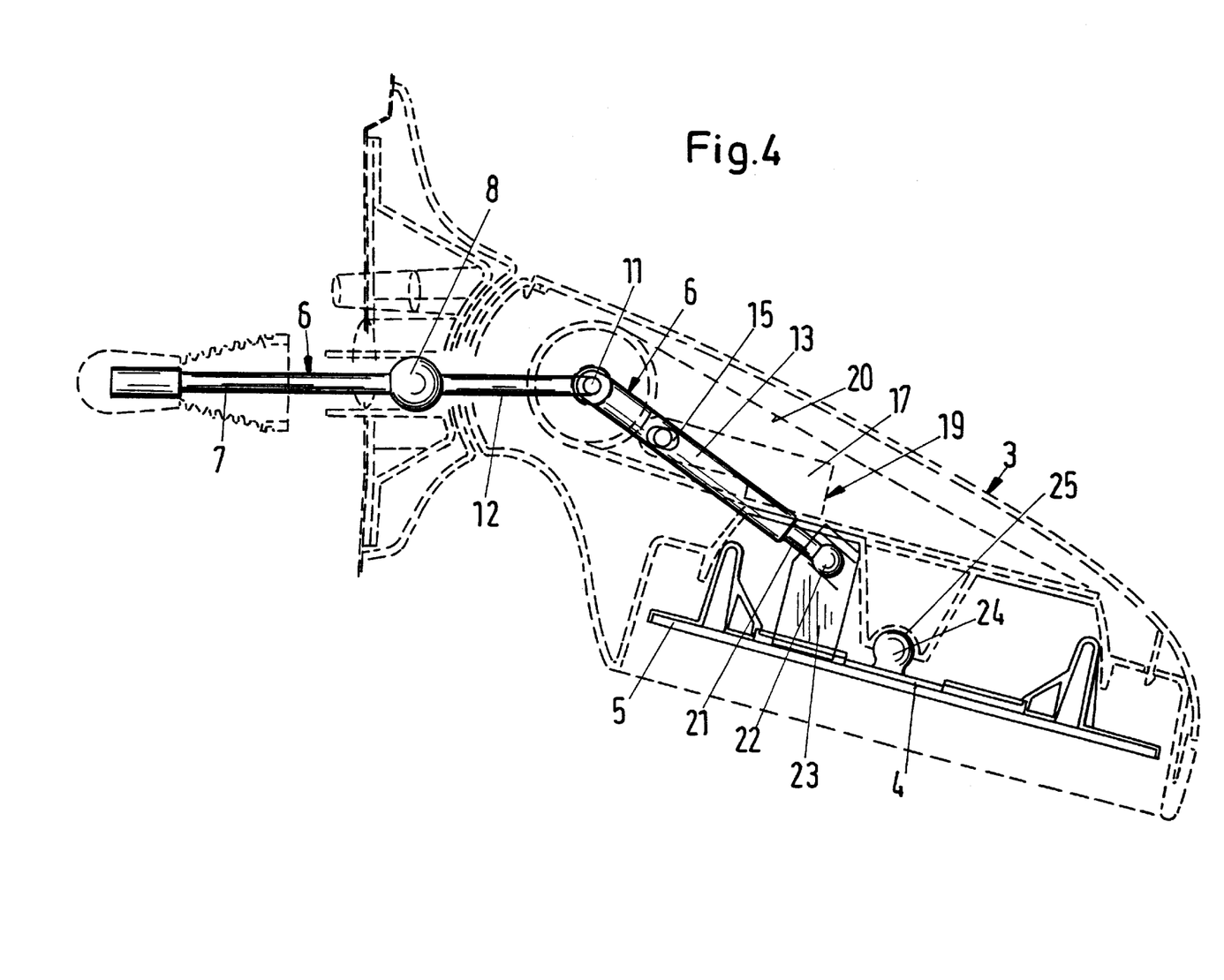
FIG. 4 is a plan view of the adjusting device of the inventive exterior rearview mirror.

The exterior rearview mirror can be mounted in a manner known per se to the right or to the left side at the exterior of the motor vehicle. It comprises a mirror arm 1 which has a transversely extending support 2 on which is supported in a manner that will be disclosed in the following a mirror housing 3 so as to be pivotable about a vertical axis. A support plate 4 (FIG. 4) is mounted in the mirror housing 3 in a known manner, and to it a mirror pane 5 is fastened. As shown in FIG. 4, the support plate 4 is connected with a ball joint to the mirror housing 3 and can be adjusted into the desired position with an adjusting device 6 from the interior of the motor vehicle.

A control lever 7 extends through the mirror arm 1 into the interior of the vehicle. The lever 7 is supported within the mirror arm 1 with a bearing ball 8 in a manner known per se. Via the bearing ball 8 the control lever 7 is rigidly connected to a U-shaped bracket 9, the leg 10 of which is connected to the bearing ball 8 and is positioned within the mirror arm 1. The other leg 11 of the bracket 9 extends into the mirror housing 3. Both legs 10 and 11 are connected to one another by a stay 12 which is arranged within the support 2 of the mirror arm 1. At the free end of the leg 11 an intermediate control member (lever) 13 is pivotably supported which at half its length has an axle 14 that, in the operational position of the exterior rearview mirror, extends upwardly and downwardly past the intermediate lever 13. The projecting ends of the axle 14, which in the operational position of the exterior rearview mirror extend vertically, project into the slotted holes 15 and 16 which are provided in the legs 17 and 18 of a U-shaped holder 19. The intermediate lever 13 extends between the two parallel legs 17 and 18 of the holder 19 which is fixedly connected to the mirror housing 3. The legs 17, 18 extend in the direction toward the mirror arm 1 and are positioned at a small acute angle to the backside 20 of the mirror housing 3 (FIG. 4). The slotted holes 15, 16 are provided in the vicinity of the free ends of the legs 17, 18 and extend in their longitudinal direction. The width of the slotted holes 15, 16 corresponds to the diameter of the axle 14.

The intermediate lever 13 is provided at the face facing away from the mirror arm 1 with a pin-shaped projection 21 which at its free end is provided with a ball 22. A bearing member 23 projects from the backside of the mirror pane support plate 4, as shown in FIG. 4, and in it the ball 22 is pivotably supported. The bearing member 23 is positioned at a distance to a bearing ball 24 which is provided centrally at the backside of the mirror pane support plate 4. The bearing ball 24 is received in a manner known per se in a bearing receiving unit 25 (FIG. 4) which is provided within the mirror housing 3.

As can be seen in FIG. 4, the control lever 7 and the bracket 9 of the adjusting device 6 are positioned in a common vertical plane.

Figure 1:
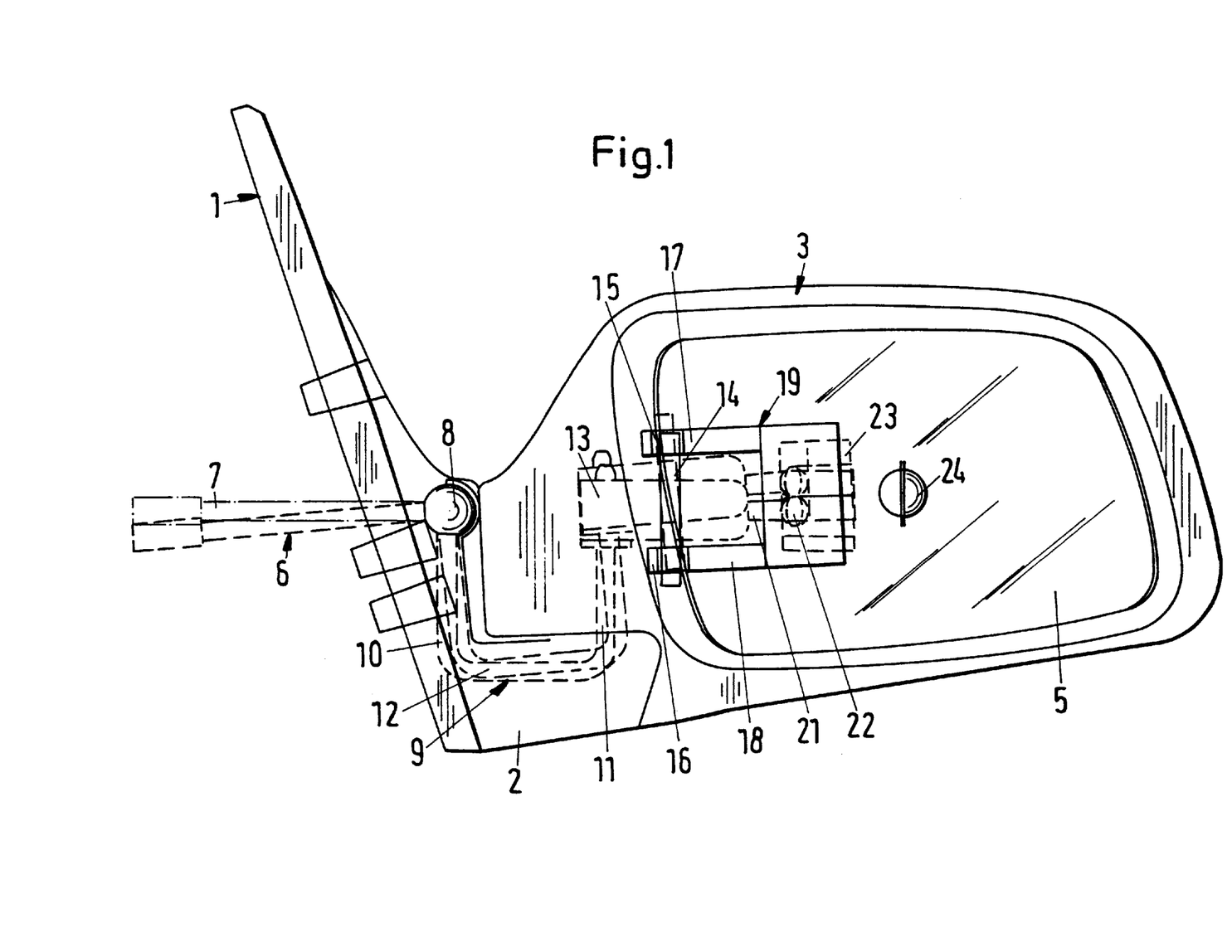
FIG. 1 is a front view of the inventive exterior rearview mirror.

When the control lever 7 is pivoted out of the position shown in solid lines in FIG. 1 into the position shown in dashed lines, the bracket 9 is pivoted upwardly. Since the intermediate lever 13 is axially fixedly connected to the leg 11 of the bracket 9, the intermediate lever 13 is correspondingly entrained. The ball 22 is form-lockingly connected to the bearing member 23. Since the ball 22 is rigidly connected to the projection 21 by the intermediate lever 13, the support plate 4 is pivoted in this manner via the bearing member 23. Since the axle 14 extends through the slotted holes 15, 16, the axle 14 can be moved during the disclosed adjusting movement within the slotted holes 15, 16 so that the disclosed adjustment process is possible. In the positions represented in FIG. 1, the intermediate lever 13 is positioned at a slant relative to the legs 17, 18 of the holder 19.

Figure 2:
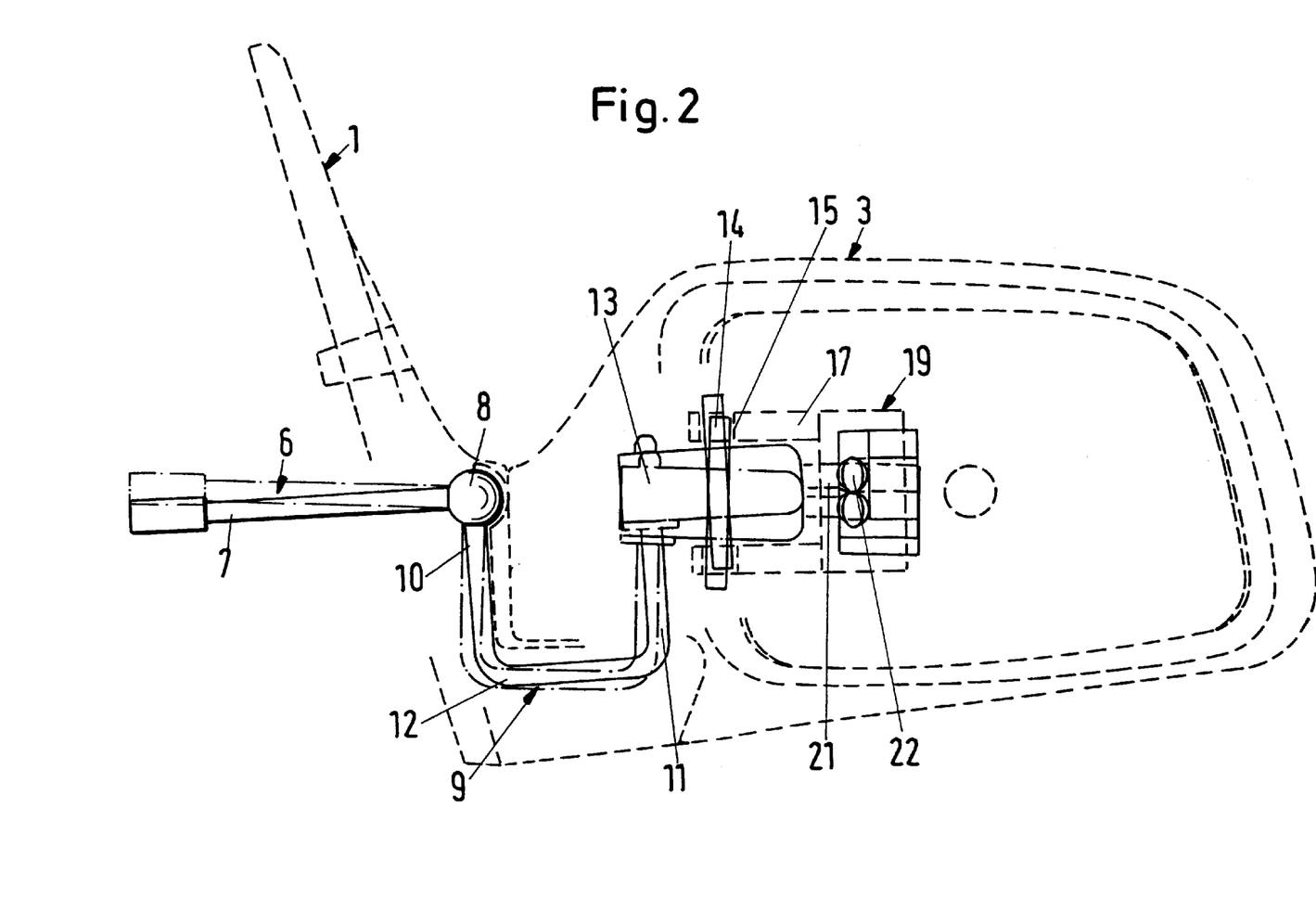
FIG. 2 is a schematic representation of an adjusting device for the mirror pane support plate of the inventive exterior rearview mirror in a front view.

From FIG. 2 it can be taken that the control lever 7 can be pivoted by the bearing ball 8 also in the reverse (clockwise) direction into the position shown in dashed lines. Accordingly, the bracket 9, the intermediate lever 13, and the support plate 4 are moved.

Figure 3:
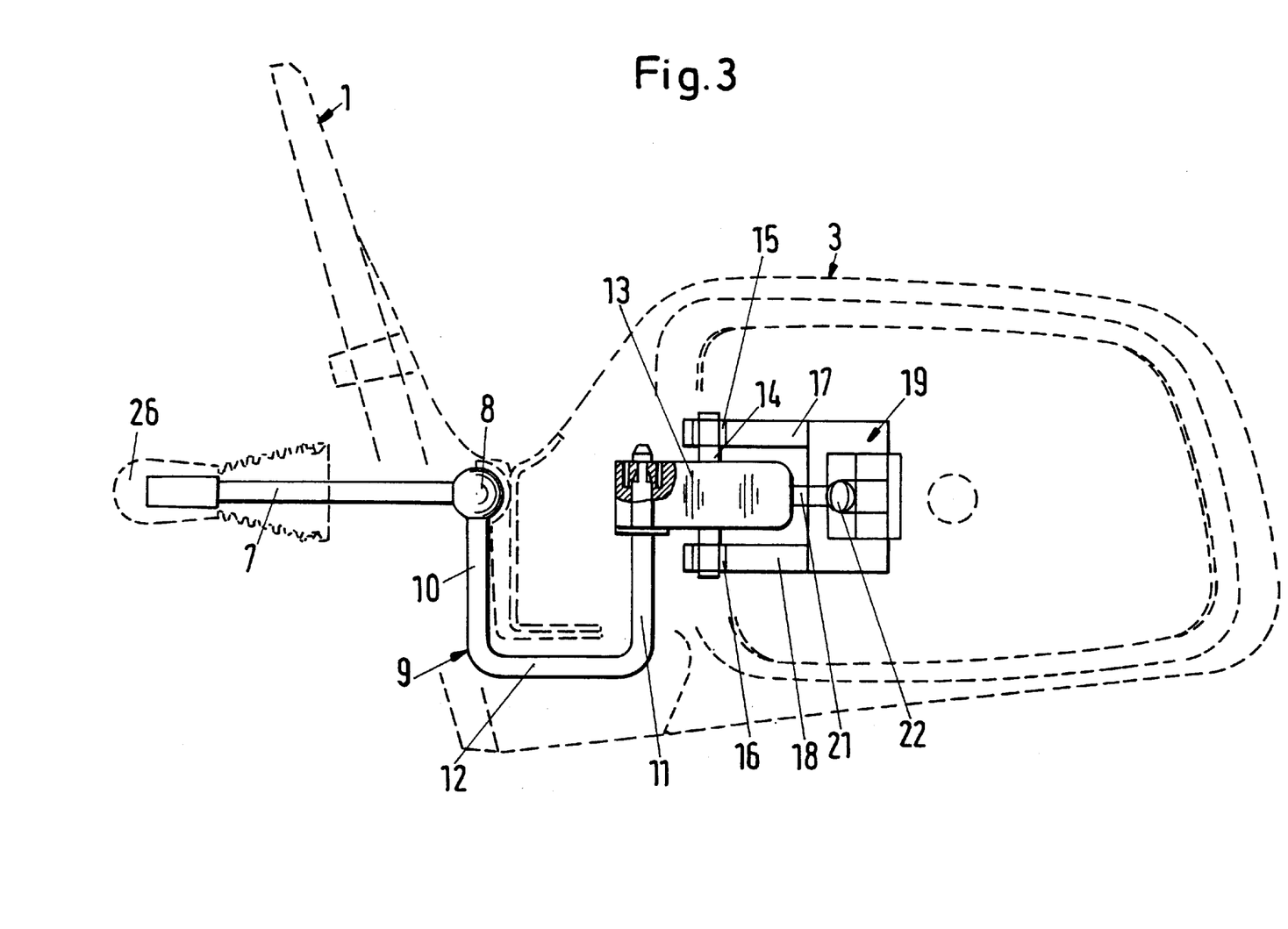
FIG. 3 shows the adjusting device according to FIG. 2, partly in section and partly in a front view.

As can be seen in FIG. 3, at the free end of the lever 7 a cover 26 is provided so that the operator of the adjusting device 6 can actuate the control lever 7 in a reliable manner.

With the disclosed adjustment, the control lever 7 has been pivoted in the vertical direction. Due to the bearing in the form of a ball joint (bearing ball 8), the control lever 7 can, of course, also be pivoted in any other direction in order to adjust the support plate 4 into the desired position.

Figure 5:
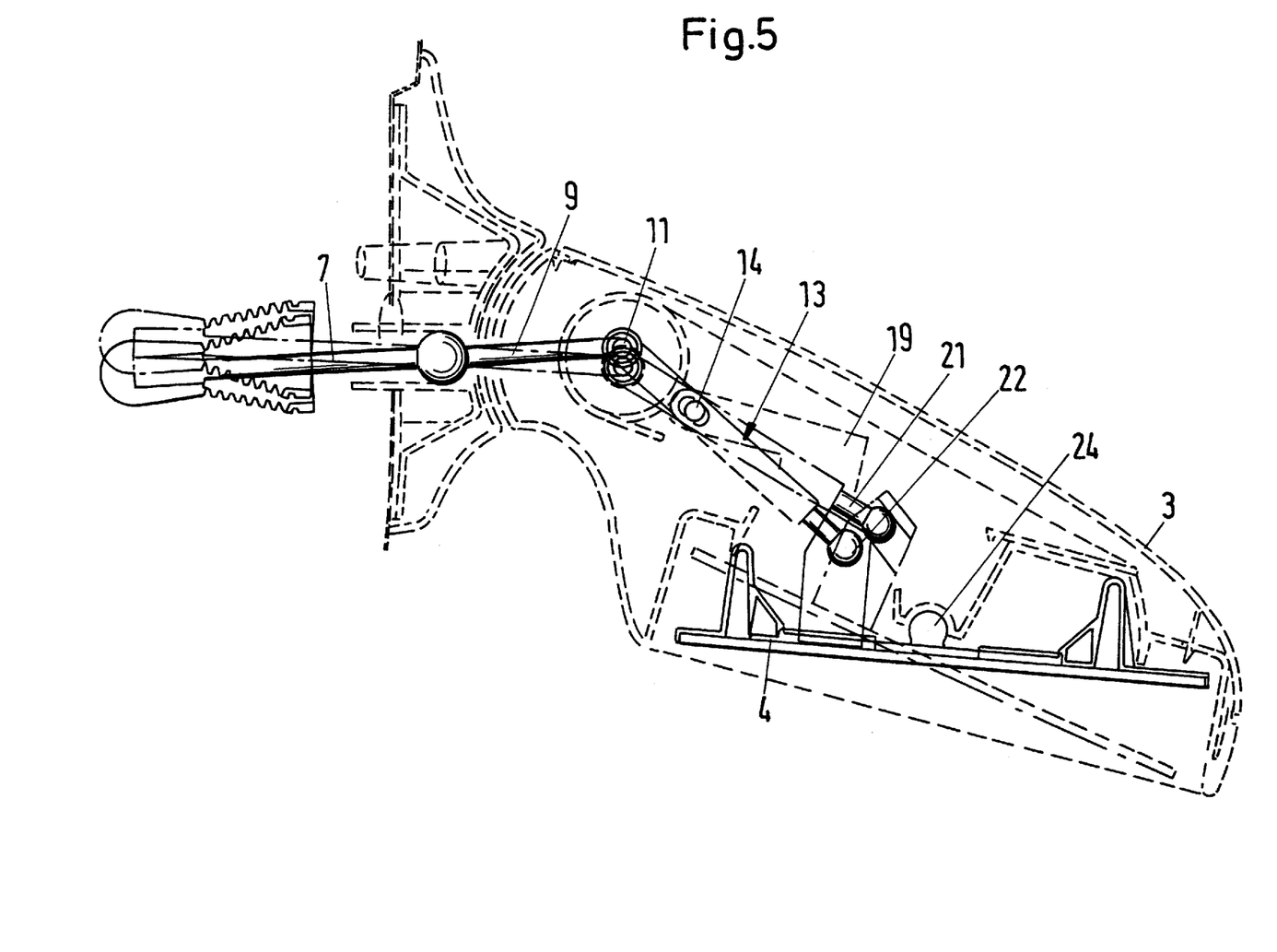
FIG. 5 is a representation according to FIG. 4 showing the support plate of the inventive exterior rearview mirror in various positions.

FIG. 5 shows the possibility of adjusting the control lever 7 in the horizontal direction. When the control lever 7 is pivoted from the position represented in solid lines in a clockwise direction into the position represented in dashed lines, the intermediate lever 13 is pivoted counter-clockwise. In this case, the axle 14 of the intermediate lever 13 is not displaced in the slotted holes of the support 19 but rotates in the slotted holes about its axis. With the projection 21 and the ball 22 of the intermediate lever 13, the support plate 4 is pivoted about the bearing 24 in the form of a ball in the clockwise direction. In this case, the support plate 4 is adjusted about an imaginary vertical axis.

Figure 6:
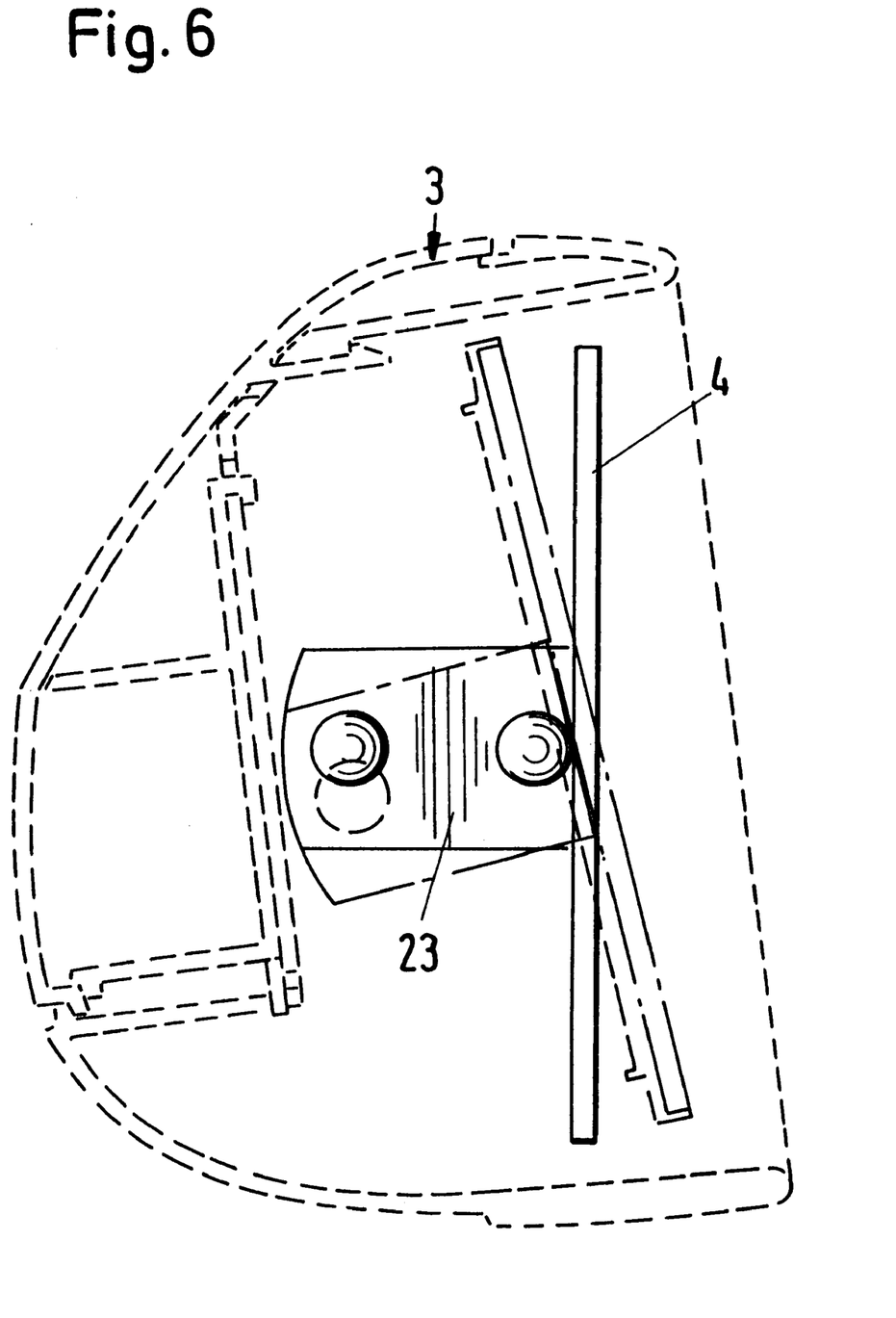
FIG. 6 is a schematic sideview of the mirror pane support plate in different positions.

When the control lever 7, as has been disclosed in connection with FIGS. 1 and 2, is moved in the vertical direction, the bearing member 23 at the backside of the support plate 4 is pivoted in the vertical direction. This results in that the slant of the support plate 4 is adjusted about an imaginary horizontal axis. In FIG. 6 the solid and dashed lines show two possible adjustment positions of the support plate 4 when pivoting the control lever 7 in the vertical direction.

Figure 7:
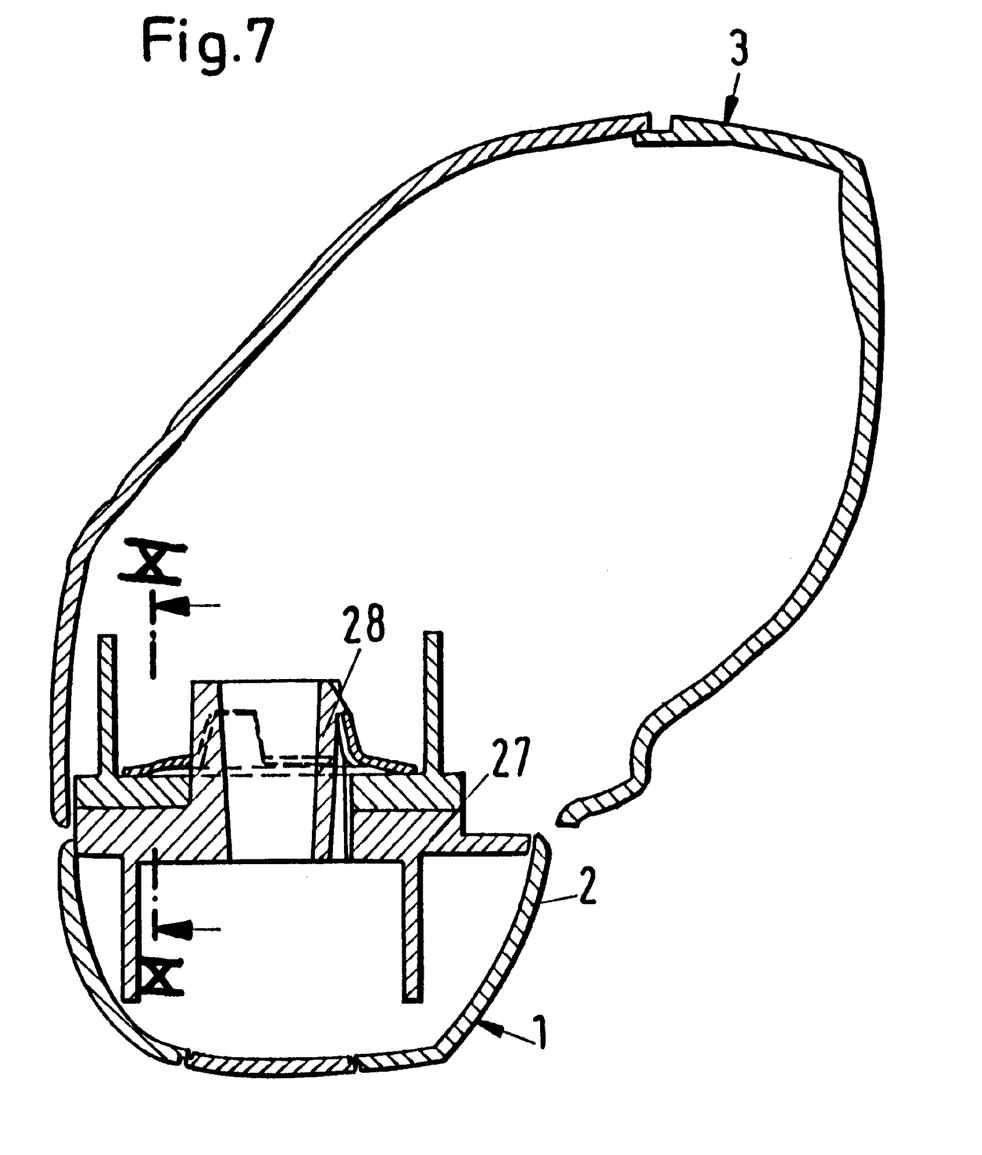
FIG. 7 shows in section the connection between the mirror arm and the mirror housing of the inventive exterior rearview mirror.
Figure 8:
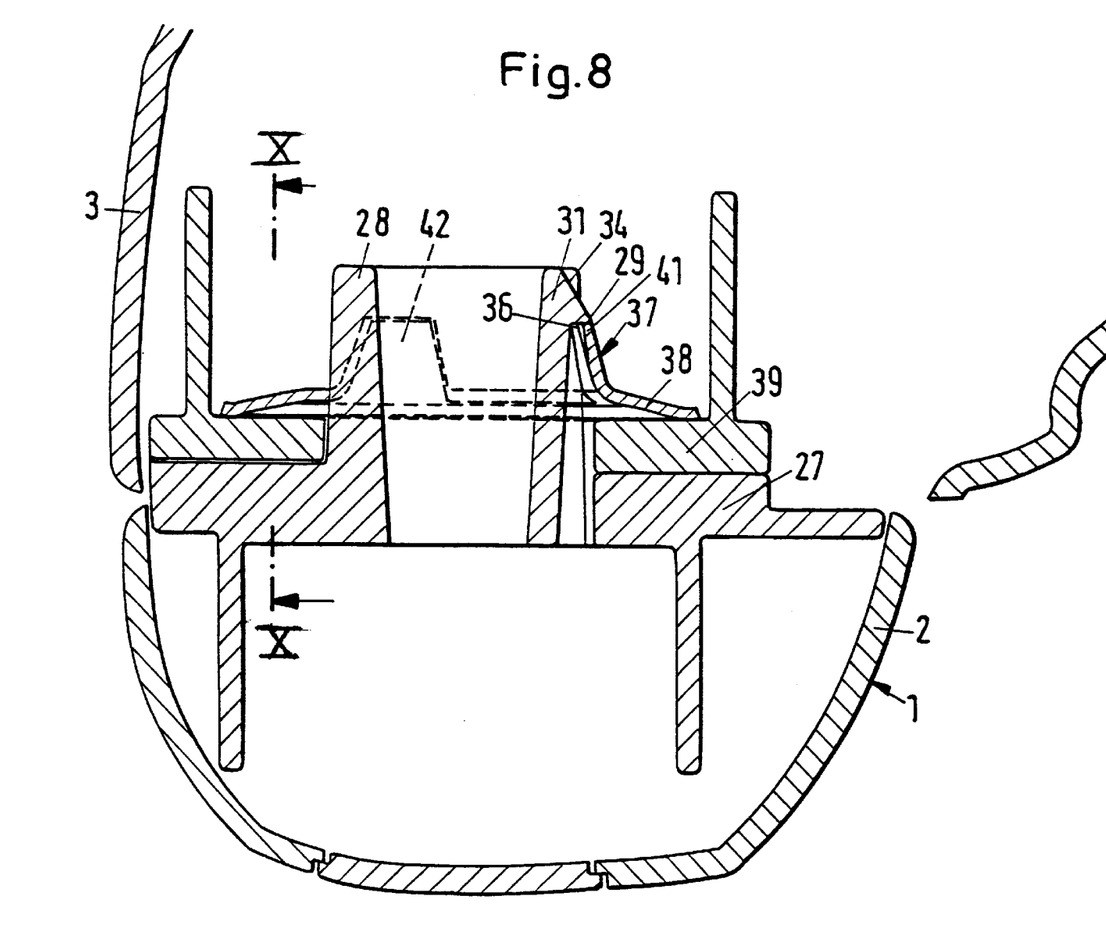
FIG. 8 shows in an enlarged representation the connecting location of FIG. 7.

The mirror housing 3 can be folded relative to the mirror arm 1 upon impact in and counter to the travel direction of the vehicle. As shown in FIGS. 7 and 8, the support 2 of the mirror arm 1 has a bearing part 27 that includes an upwardly extending sleeve-shaped projection 28 that projects in the upward direction past the support 2. At its free end it is provided with at least one external undercut 29 (FIG. 8). In the shown embodiment three undercuts 29 are provided which are distributed about the circumference of the projection 28 preferably in a uniform arrangement. For forming the undercuts 29 the free end of the projection 28 is provided with three spaced-apart radial projections 30 to 32 (FIG. 12) which have a surface 33 to 35 that extends on a conical mantle. They have a transition into an underside, extending at an acute angle in the radial direction relative to the axis of the projection 28 whereby in FIG. 8 the underside 36 of the projection 31 is represented. These undersides 36 form the undercuts 29. They serve as abutments for a spring disk 37 with which the mirror housing 3 is frictionally connected to the mirror arm 1 in a manner to be disclosed in the following.

The spring disk 37 has a conical base body 38 the circumferential edge of which is resting on a support element 39 of the mirror housing 3. It rests on the bearing part 27 of the mirror arm 1.

The base body 38 of the spring disk 37 tapers in the direction onto the free end of the projection 28 of the bearing part 27. Three tabs 40 to 42 extend at a slant upwardly from the base body 38, whereby the tabs 40 to 42 are preferably uniformly distributed about the circumference. Their free ends abut the undersides 36 of the projections 30 to 32.

The base body 38 and the tabs 40 to 42 of the spring disk 37 are embodied such that in the mounted state of the spring disk 37 they are elastically tensioned. In this manner, the mirror housing 3 is fixedly pressed with its support element 39 against the bearing part 27 of the mirror housing 1.

When an impact on the mirror housing 3 occurs in or counter to the travel direction of the motor vehicle, the mirror housing 3 can pivot about the axis of the projection 28 of the bearing part 27 of the mirror arm 1 in the respective direction. The spring disk 37 remains in its position whereby during pivoting the support element 39 of the mirror housing 3 is rotated relative to the spring disk 37. In the respective pivoted position the mirror housing 3 is arrested at the spring disk 37 due to the aforementioned tension. With this pivot action, the mirror pane support plate 4 is not moved relative to the mirror housing 3. When the mirror housing 3 is returned into its operational position, the mirror pane support plate 4 will reassume its original operational position. This is so because the pivot axis, respectively, folding axis of the mirror housing 3 is substantially identical to the axis of the leg 11 of the bracket 9. Thus, upon folding of the mirror housing 3, the control lever 7 with the bracket 9 remain in their adjusted position while the intermediate lever 13 is moved during folding relative to the bracket 9. Thus, the support plate 4 remains in its adjusted position relative to the mirror housing 3.

Figure 9:
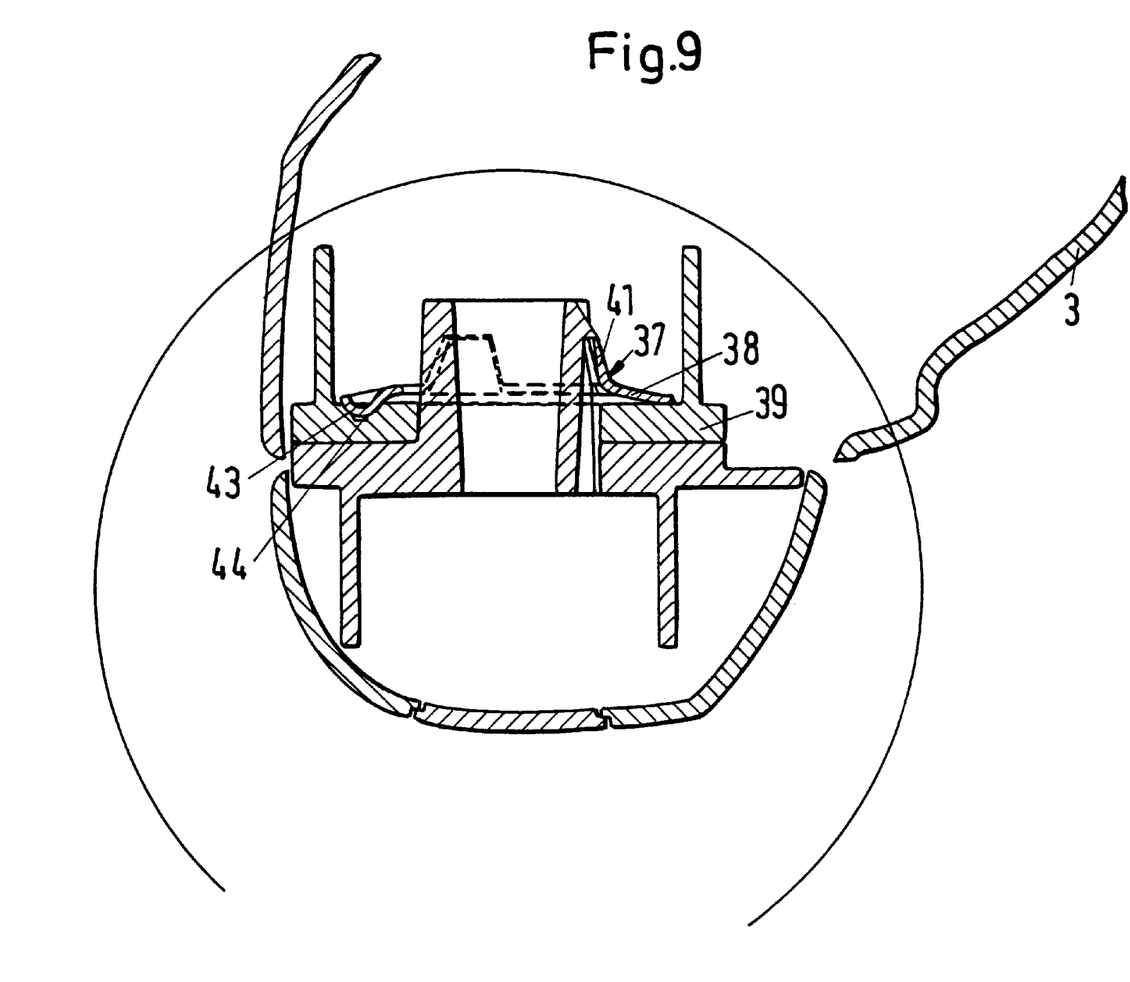
FIG. 9 is a representation according to FIG. 7 of a second embodiment of the inventive exterior rearview mirror.
Figure 10:
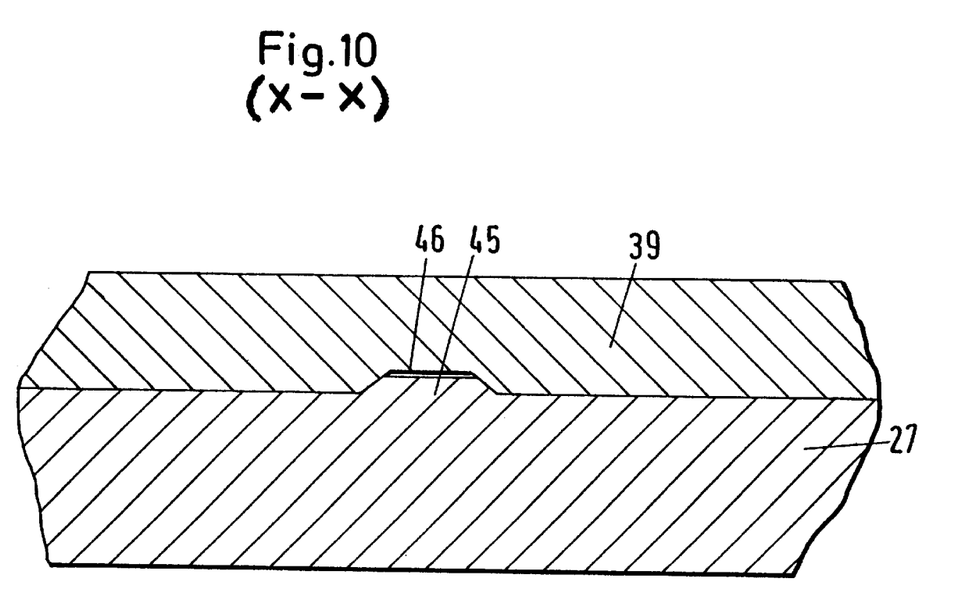
FIG. 10 shows in an enlarged representation a section along the line X—X in FIG. 7.
Figure 11:
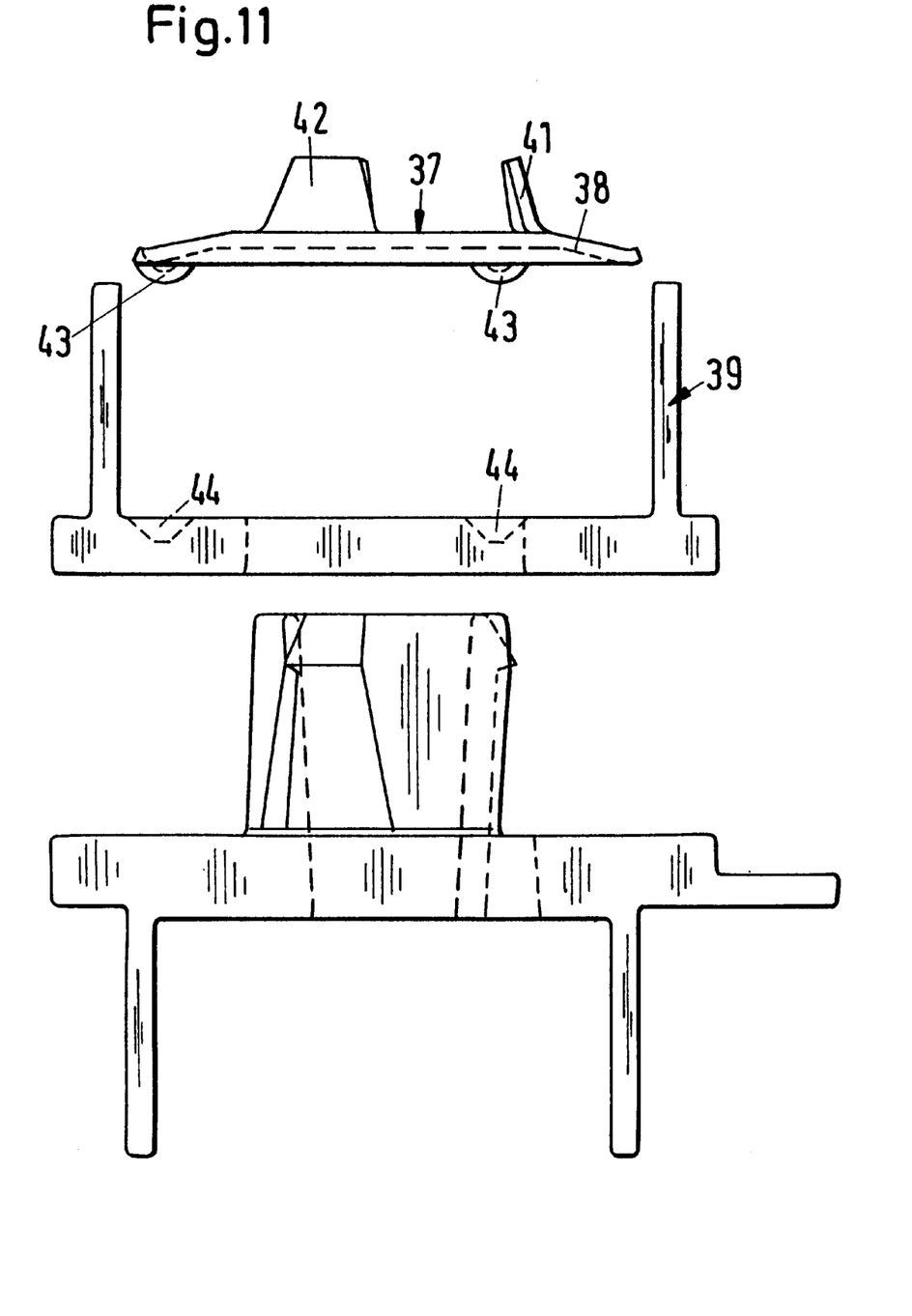
FIG. 11 shows in an exploded view the connecting location according to FIG. 9.

In FIGS. 9 through 11 an embodiment of a spring disk 37 is represented the base body 38 of which has snap-on elements 43 extending in the counter direction relative to the tabs 40 to 42. They engage respective snap-on recesses 44 of the support element 39 of the mirror housing 3. These snap-on elements 43 have, as shown in FIG. 11, part-circular cross-section. Advantageously, they are formed by stamping areas of the base body 38 of the spring disk 37. Otherwise, the spring disk 37 is of same construction as in the previous embodiment.

When the mirror housing 3 in the travel direction is folded forwardly or rearwardly relative to the mirror arm 1, the support element 39 moves relative to the spring disk 37 because it is a component of the mirror housing 3. The snap-on elements 43 are thus moved out of the snap-on recesses 44. Since the snap-on elements 43 have a part-circular cross-section, they can easily be removed from the recesses 44. When the mirror housing 3 is returned into its initial position, the snap-on elements automatically snap into the recesses 44.

Figure 12:
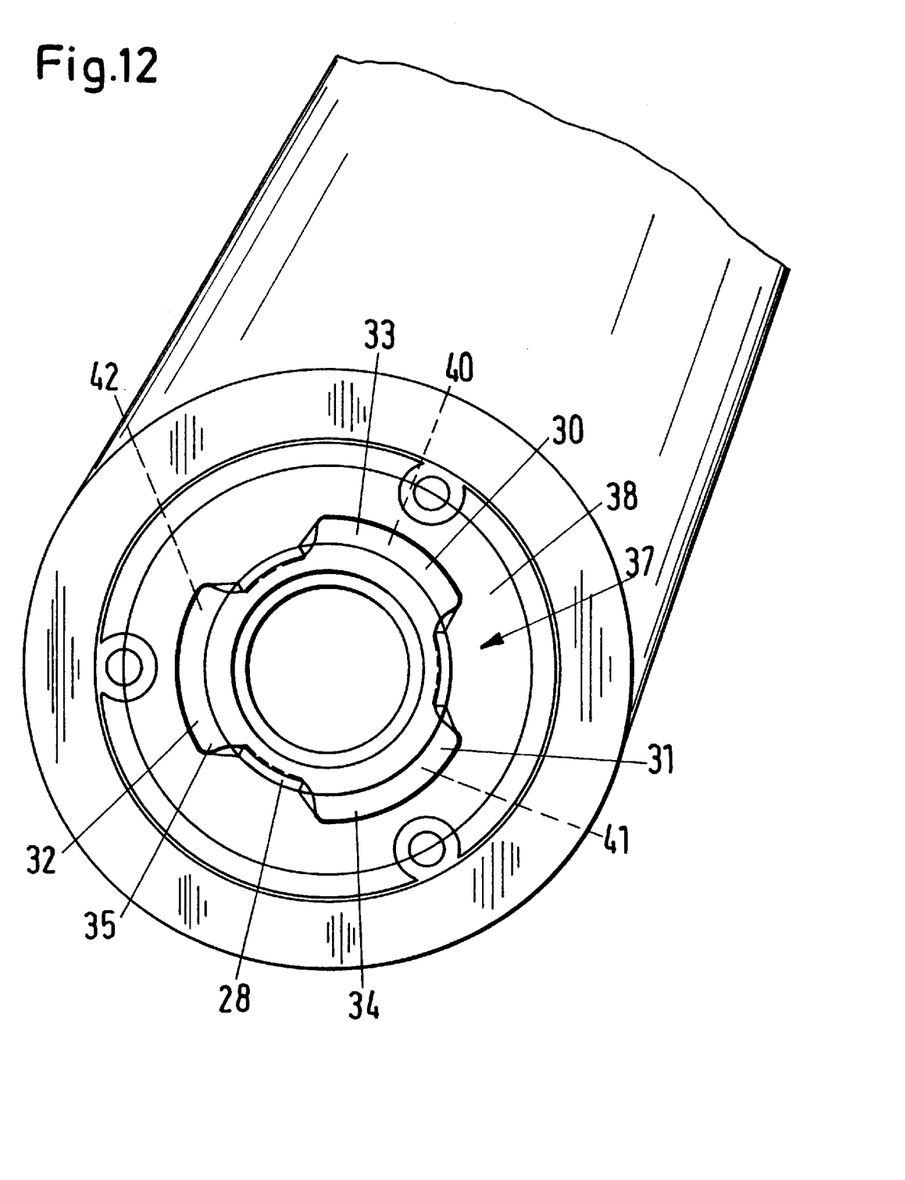
FIG. 12 shows a plan view of the connecting location of FIG. 9.
Figure 13:
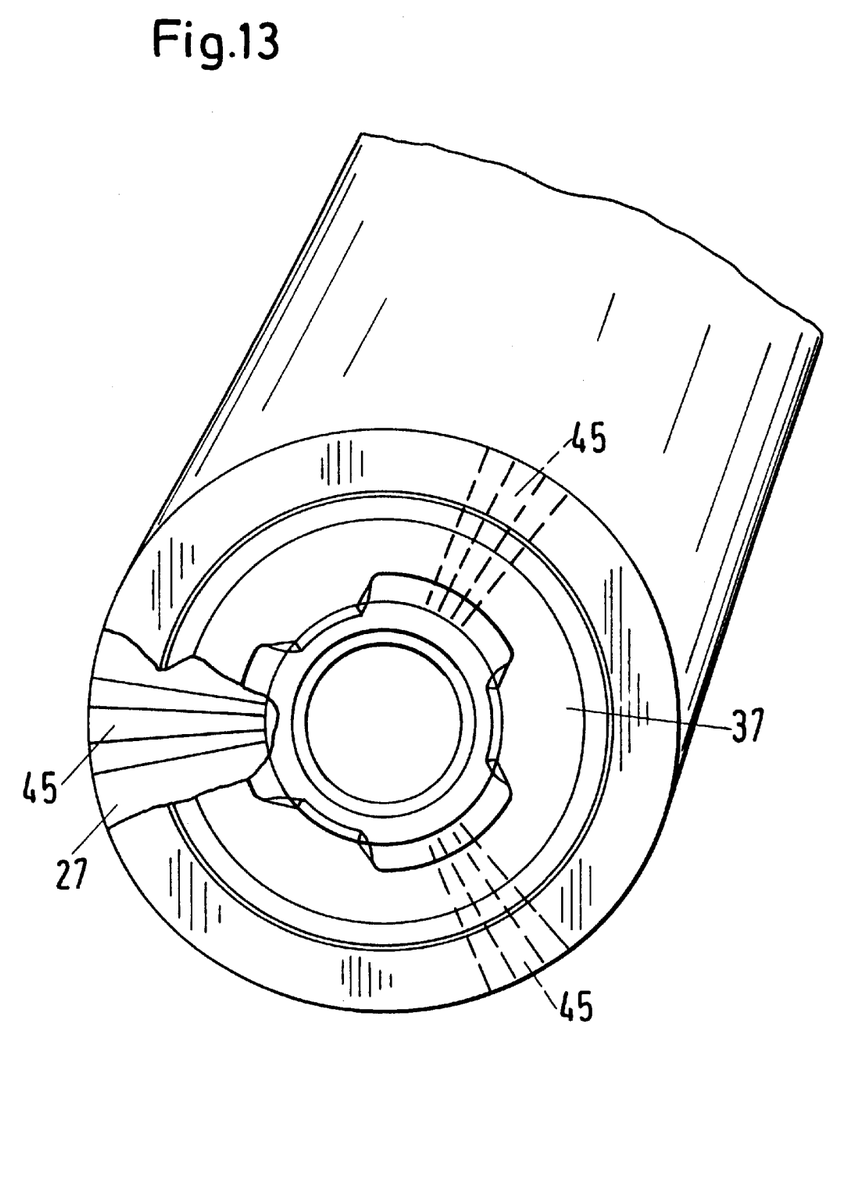
FIG. 13 shows the connecting location according to FIG. 12, partly in section.

In order for the support element 39 of the mirror housing 3 maintain a defined position in the operative position of the mirror housing in the embodiment of FIGS. 7, 8, 12, the support element 39 is advantageously provided with rib-shaped projections 45 (FIGS. 10 and 13) which have a trapezoidal cross-section and which engage corresponding depressions 46 within the support element 39 of the mirror housing 3. As shown in FIG. 13, over the circumference of the bearing part 27 three such projections 45 are provided which extend radially. Due to the trapezoidal cross-section, the support element 39, upon folding of the mirror housing 3, can be easily released from the projections 45 of the bearing part 27 which remains stationary during the folding action.

Due to the disclosed embodiment of the spring disk 37 additional pressure springs are not required. The tabs 40 to 42 of the spring disk 37 are supported on the projections 30 to 32 of the projection 28 of the bearing part 27 such that the spring disk 37 is elastically tensioned and in this manner strongly forces the support element 39 of the mirror housing 3 against the bearing part 27 of the mirror arm 1.

The present invention is, of course, in no way restricted to the specific disclosure of the specification and drawings, but also encompasses any modifications within the scope of the appended claims.

What I claim is:

1. An exterior rearview mirror for motor vehicles, said exterior rearview mirror comprising:

a mirror arm and a mirror housing connected to said mirror arm so as to be foldable about a pivot axis relative to said mirror arm;

a support plate mounted in said mirror housing;

a mirror pane attached to said support plate so as to face outwardly relative to said mirror housing;

an adjusting device for adjusting a position of said mirror pane from the interior of a motor vehicle;

said adjusting device comprising a first adjusting member accessible from the interior of the motor vehicle;

said adjusting device comprising a second adjusting member mounted within said mirror housing;

said first and said second adjusting members connected to one another so as to be pivotable about a common axis;

wherein said common axis coincides substantially with said pivot axis of said mirror housing;

wherein said second adjusting device comprises a control member supported rotatably on said common axis of said first adjusting member;

wherein said housing has a fixedly mounted holder;

wherein said control member comprises an axle and said axle is supported in said holder.

2. An exterior rearview mirror according to claim 1, wherein said first adjusting member is pivotably supported within said mirror arm.

3. An exterior rearview mirror according to claim 1, wherein said first adjusting member includes a control lever projecting into the interior of the motor vehicle and an intermediate member rigidly connected to said control lever and extending into said mirror housing.

4. An exterior rearview mirror according to claim 3, wherein said control lever is a one-arm lever.

5. An exterior rearview mirror according to claim 3, wherein said intermediate member is a U-shaped bracket having a first leg forming said common axis.

6. An exterior rearview mirror according to claim 5, wherein:

said first adjusting member further comprises a bearing ball;

said U-shaped bracket has a second leg;

said control lever connected to said bearing ball and said second leg rigidly connected to said bearing ball.

7. An exterior rearview mirror according to claim 3, wherein said control lever and said intermediate member are positioned in a common plane.

8. An exterior rearview mirror according to claim 1, further comprising a spring disk positioned between said mirror housing and said mirror arm and biasing said mirror housing against said mirror arm.

9. An exterior rearview mirror according to claim 8, wherein said mirror arm comprises a projection and wherein said spring disk surrounds said projection.

10. An exterior rearview mirror according to claim 9, wherein said mirror housing has a support member surrounding said projection.

11. An exterior rearview mirror according to claim 10, wherein said spring disk rests on said projection.

12. An exterior rearview mirror according to claim 9, wherein said projection has an abutment for supporting said spring disk.

13. An exterior rearview mirror for motor vehicles, said exterior rearview mirror comprising:

a mirror arm and a mirror housing connected to said mirror arm so as to be foldable about a pivot axis relative to said mirror arm;

a support plate mounted in said mirror housing;

a mirror pane attached to said support plate so as to face outwardly relative to said mirror housing;

an adjusting device for adjusting a position of said mirror pane from the interior of a motor vehicle;

said adjusting device comprising a first adjusting member accessible from the interior of the motor vehicle;

said adjusting device comprising a second adjusting member mounted within said mirror housing;

said first and said second adjusting members connected to one another so as to be pivotable about a common axis;

wherein said common axis coincides substantially with said pivot axis of said mirror housing;

a spring disk positioned between said mirror housing and said mirror arm and biasing said mirror housing against said mirror arm;

wherein said mirror arm comprises a projection and wherein said spring disk surrounds said projection;

wherein said projection has an abutment for supporting said spring disk;

wherein said spring disk has at least one tab for resting on said abutment.

14. An exterior rearview mirror according to claim 8, wherein said spring disk has at least one snap-on element and wherein said mirror arm has at least one snap-on counter element for cooperating with said at least one snap-on element.

15. An exterior rearview mirror according to claim 13 wherein said second adjusting device comprises a control member supported rotatably on said common axis of said first adjusting member.

16. An exterior rearview mirror according to claim 15, wherein:

said housing has a fixedly mounted holder;

said control member comprises an axle;

said axle is supported in said holder.

17. An exterior rearview mirror according to claim 16, wherein said axle is displaceable within said holder in a direction transverse to an axis of said axle.

18. An exterior rearview mirror according to claim 17, wherein said holder has two parallel legs each having a slotted hole engaged by said axle.

19. An exterior rearview mirror according to claim 15, wherein said control member is pivotably connected to said support plate.

20. An exterior rearview mirror according to claim 19, wherein said support plate has a bearing member projecting from a face of said support plate facing an interior of said mirror housing, wherein said control member engages said bearing member.

* * * * *